United States Patent [19]

Brandt et al.

[11] 4,321,795

[45] Mar. 30, 1982

[54] PROCESS FOR THE PURIFICATION OF GASEOUS CHLORINE

[76] Inventors: Helmut Brandt, Kaldehofweg 49, 4600 Dortmund 12; Helga U. Payer, Am Hang 1, 4600 Dortmund 30; Michael A. Payer, Am Hang 1, 4600 Dortmund 30; Heike U. Payer, Am Hang 1, 4600 Dortmund 30, all of Fed. Rep. of Germany

[21] Appl. No.: 189,677

[22] Filed: Sep. 22, 1980

[51] Int. Cl.³ .............................................. F17C 13/00
[52] U.S. Cl. ...................................... 62/54; 55/23; 62/11; 204/128
[58] Field of Search ................... 62/54, 55, 11; 55/23; 204/128

[56] References Cited

U.S. PATENT DOCUMENTS

| | | | |
|---|---|---|---|
| 1,584,376 | 5/1926 | Jewell | 62/11 |
| 3,043,111 | 7/1962 | Schmidt et al. | 62/11 |
| 3,230,724 | 1/1966 | Havas | 62/11 |
| 3,237,417 | 3/1966 | Honigh | 62/11 |
| 3,535,885 | 10/1970 | Frijunk et al. | 62/55 |
| 3,712,940 | 1/1973 | Silby | 134/13 |
| 3,747,359 | 7/1973 | Streich | 62/11 |
| 3,957,950 | 5/1976 | Geiger et al. | 204/128 |
| 3,972,691 | 8/1976 | Fukushima et al. | 55/23 |

FOREIGN PATENT DOCUMENTS 1560614  3/1969  France .................................. 62/11

*Primary Examiner*—Ronald C. Capossela
*Attorney, Agent, or Firm*—Wilson, Fraser, Barker & Clemens

[57] ABSTRACT

The present invention relates to the purification of gaseous chlorine by means of compression, liquefaction and re-evaporation. It relates in particular to the purification of gaseous chlorine with a high inert gas content, such as is obtained in diaphragm type alkaline chloride electrolysis processes.

3 Claims, 1 Drawing Figure

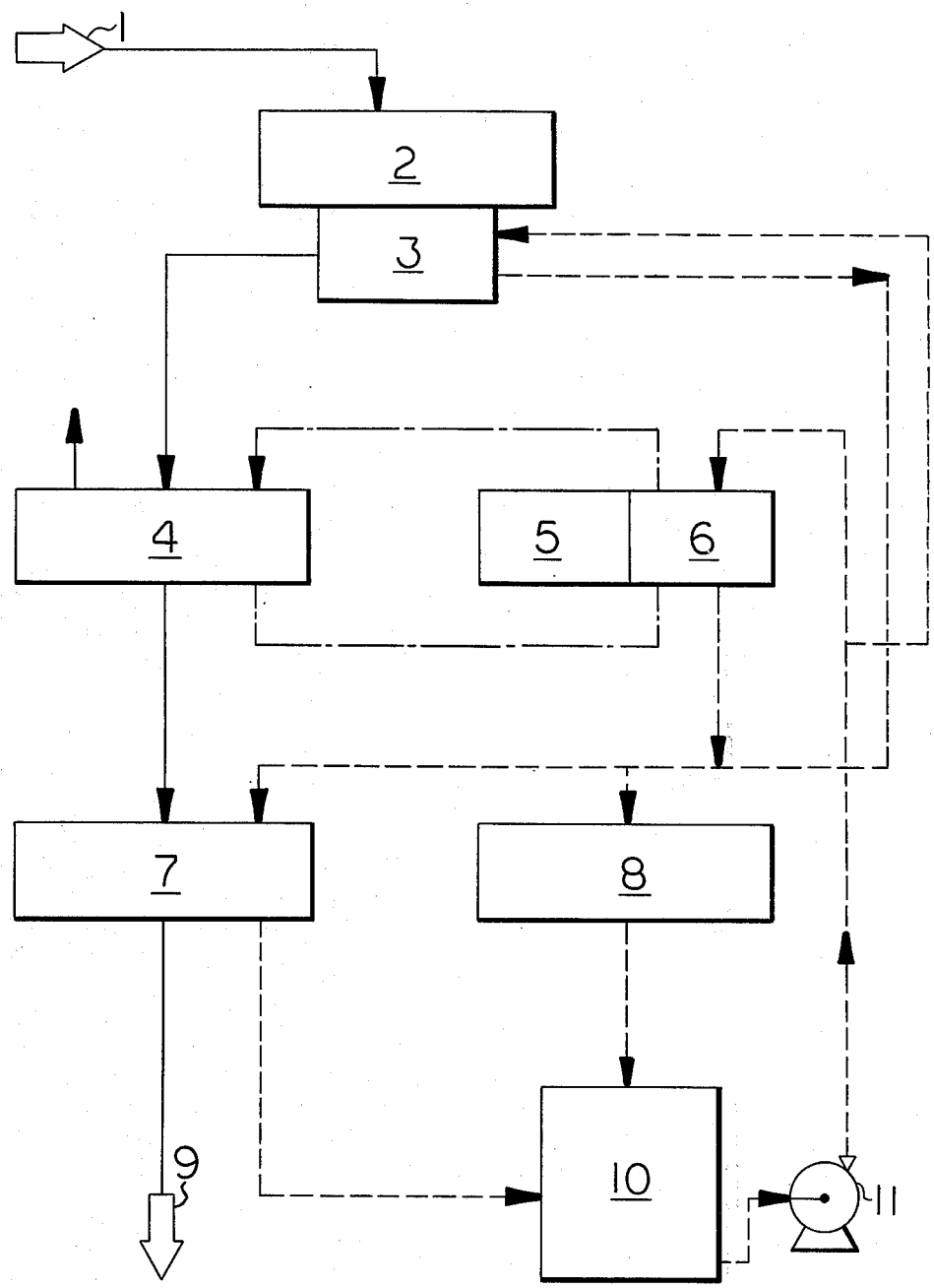

PROCESS FOR THE PURIFICATION OF GASEOUS CHLORINE

SUMMARY OF THE INVENTION

The purification of gaseous chlorine with a high inert gas content is often necessary when for reasons of yield, product quality and plant reliability, a certain degree of purity is stipulated for the further processing of the gaseous chlorine.

Whereas previously the amalgam electrolysis process was mainly used for the production of gaseous chlorine and the gaseous chlorine only had to be subjected to a drying step in order to achieve the required product quality, the diaphragm electrolysis process is now preferred to an increasing extent.

However, the disadvantage of the diaphragm electrolysis process is the inferior quality of the gaseous chlorine i.e. higher concentration of inert gases and oxygen. The inerts are conventionally removed from the gaseous chlorine by condensing the gaseous chlorine and subsequently evaporating the liquid chlorine. Any inert gases remaining in gaseous state during condensation step are thus separated from the chlorine. The gaseous chlorine purification process comprises the compression of the gaseous chlorine to the required liquefaction pressure, the liquefaction of the gaseous chlorine by means of external refrigeration and the subsequent re-evaporation of the chlorine by superheating. According to the present level of technology, the heat of compression is dissipated to cooling water in the intermediate and final coolers of the chlorine compressor. The heat of liquefaction is withdrawn with the aid of a refrigerating machine and transferred to cooling water; the necessary heating and evaporation of the chlorine is achieved by means of superheated steam. In order to prevent damage due to corrosion, the gaseous chlorine side is operated under pressure. In addition, elaborate methods of analysis are usually used to detect the presence of any chlorine in the cooling water.

Although the conventional process for the purification of gaseous chlorine is characterized by simplicity, the use of normally available heat carriers such as cooling water and superheated steam and by the use of standard equipment, it is none the less in need of improvement, firstly because of the problem of leaks in the coolers and the fact that this involves damage to the coolers due to corrosion and secondly because an energy link must be established between the different process steps without using any fluids or facilities that would increase the cost of the process.

The problem is solved in the present invention by the fact that the heat of compression and liquefaction is dissipated to a heat carrier and the hot heat carrier is used for evaporating and superheating the liquefied purified chlorine.

It is an advantage to use hexachlorobutadiene $C_4Cl_6$ as the heat carrier.

If the gaseous chlorine is produced in a diaphragm type electrolysis plant, a further embodiment of the invention permits part of the hot heat carrier to be used for heating a raw material stream within such electrolysis plants.

The advantages achieved with the invention are mainly that the heat exchangers for gaseous or liquid chlorine on one side do not have cooling water or steam flowing through them on the other side. Undesirable corrosion caused by gaseous chlorine entering the water side due to leaks is thus avoided.

In addition, there is no need to use superheated steam for gasifying the liquid chlorine.

This results primarily in an energy saving, but it also constitutes a considerable improvement in the reliability and profitability for the entire complex in which gaseous chlorine is produced by means of the diaphragm electrolysis process normally in conjunction with the gaseous chlorine purification.

BRIEF DESCRIPTION OF THE DRAWING

The FIGURE is a flow diagram of the process in accordance with the invention.

The process described below and in the flow diagram represents a preferred configuration.

DETAILED DESCRIPTION OF THE PREFERRED EMBODIMENT

Gaseous chlorine from a diaphragm electrolysis plant is dried and fed at a temperature of approx. 15° C. via line 1 to the multi-stage gaseous chlorine compressor 2 which incorporates the intermediate and final coolers 3. In the intermediate and final coolers, the heat of compression is dissipated to the heat carrier (circulating hexachlorobutadiene). The gaseous chlorine is compressed to approx. 6 bar and cooled to a temperature of about 40° C. before being fed to the two-stage gaseous chlorine liquefier 4 in which the gaseous chlorine is liquefied by means of the multi-stage refrigeration unit 5. The inerts and other unwanted components which remain in the gaseous phase, for example mainly $H_2$, $O_2$, $CO_2$ and $N_2$, are removed. Liquid chlorine leaves the gaseous chlorine liquefier 4 at a temperature of approx. $-12°$ C. The condenser 6 of the refrigeration unit 5 is likewise cooled, i.e. the heat of liquefaction and compression is dissipated, by the heat carrier, which is thus heated from 25° C. to approx. 40° C., is likewise used for cooling the condenser 6 of the refrigeration unit 5, i.e. dissipation of heat of liquefaction and heat of compression. Part of the hot heat carrier leaving the gaseous chlorine compressor and the refrigeration unit is fed to the liquid chlorine evaporator 7 and another part to the additional cooler 8 in order to be cooled to approx. 25° C. The purified gaseous chlorine is available for use, via line 9, at a pressure of approx. 5 bar and a temperature of 10° C. via line 9.

When the heat carrier has been cooled to approx. 25° C. in the two above mentioned heat exchangers, it is returned to the intermediate and final coolers and the condenser via a collecting tank 10 and a pump 11.

In addition, the process according to the invention is suitable for treating gaseous chlorine with an inert gas content from various processes as long as the required purity can be achieved by liquefaction of the chlorine and removal of the inert gas. An example which deserves particular mention is $M_gCl_2$ fusion electrolysis, in which gaseous chlorine is obtained as a by-product.

What we claim is:

1. In a process for the purification of gaseous chlorine by means of compression, liquefaction and re-evaporation, the improvement which comprises dissipating the heat of compression and liquefaction by transfer to a heat carrier which is inert to chlorine, and transferring heat from the hot heat carrier for re-evaporating and superheating the liquefied purified chlorine.

2. The improvement according to claim 1, wherein the heat carrier is hexachlorobutadiene $C_4Cl_6$.

3. The improvement according to claims 1 or 2, wherein heat is also transferred from the hot heat carrier for heating a raw material stream.

* * * * *

UNITED STATES PATENT AND TRADEMARK OFFICE
CERTIFICATE OF CORRECTION

PATENT NO. : 4,321,795

DATED : March 30, 1982

INVENTOR(S) : Helmut Brandt, Helga U. Payer, Michael A. Payer, Heike U. Payer

It is certified that error appears in the above-identified patent and that said Letters Patent are hereby corrected as shown below:

On the title page, add Item [73] Assignee: to read:

-- UHDE GmbH, Dortmund, Fed. Rep. of Germany --.

Signed and Sealed this

Thirteenth Day of July 1982

[SEAL]

Attest:

Attesting Officer

GERALD J. MOSSINGHOFF

Commissioner of Patents and Trademarks